C. W. WALKER ET AL

1,480,919

TYPEWRITING MACHINE

Filed Nov. 11, 1922  6 Sheets-Sheet 5

INVENTORS
CHARLES W. WALKER, DECEASED.
BY ARIO C. WALKER, ADMINISTRATOR,
AND ARIO C. WALKER.
BY
ATTORNEY

Jan. 15, 1924.  1,480,919
C. W. WALKER ET AL
TYPEWRITING MACHINE
Filed Nov. 11, 1922    6 Sheets-Sheet 6

INVENTOR
CHARLES W. WALKER, DECEASED.
BY ARIO C. WALKER, ADMINISTRATOR,
AND ARIO C. WALKER.

ATTORNEY

Patented Jan. 15, 1924.

1,480,919

UNITED STATES PATENT OFFICE.

CHARLES WELLINGTON WALKER, DECEASED, LATE OF STRATFORD, AND ARIO C. WALKER, OF BRIDGEPORT, CONNECTICUT; BY ARIO C. WALKER, ADMINISTRATOR, OF BRIDGEPORT, CONNECTICUT.

TYPEWRITING MACHINE.

Application filed November 11, 1922. Serial No. 600,365.

*To all whom it may concern:*

Be it known that we, CHARLES WELLINGTON WALKER, now deceased, formerly a citizen of the United States, residing at Stratford, Conn., and ARIO C. WALKER, a citizen of the United States of America, residing at Bridgeport, county of Fairfield, and State of Connecticut, have invented certain new and useful Improvements in Typewriting Machines, of which the following is a specification.

This invention relates to typewriting machines. There are a large number of objects in view, among them being the provision of printing mechanism, which is of such a nature that a complete line, or what is practically the same thing, a partial line, can be set up by the operator and afterwards printed, by reason of which fact a correction can be made before printing in the event that a wrong type key has been operated. Radical improvements also are made in other parts of the machine, as will be hereinafter more particularly set forth.

A machine involving the invention is capable of wide modification. In the drawings, however, accompanying and forming part of the present specification, there is illustrated in detail one of the many forms of embodiment of the invention, so that those skilled in the art can practice the same. This will be set forth fully in the following description. Obviously, the invention is not restricted to such disclosure. Departures therefrom can be made in many respects within the scope of the claims following said description.

Referring to said drawings.

The various parts of the machine are supported by a suitable frame such as that denoted in a general way by 2. This frame may be made of plates, and is generally more or less rectangular, and of skeleton formation such as is the case with typewriting machines of the ordinary kind. The frame involves in its make-up two side pieces 3 and 4, approximately parallel with each other, and running from the front to the back of the machine.

The machine in question, involves in its make-up several key levers such as 5, which as shown are supported for rocking or swinging movement at their rear ends, by the cross bar or shaft 6 (Fig. 2) sustained between the side pieces 3 and 4. The key levers 5, as best shown in Fig. 2, are provided with upwardly extending arms or branches 7, of variable or different lengths, and are provided at their upper ends with keys 8, which bear characters as is the fashion with ordinary typewriters, and which appear fully in Figs. 1 and 4.

Figure 1:
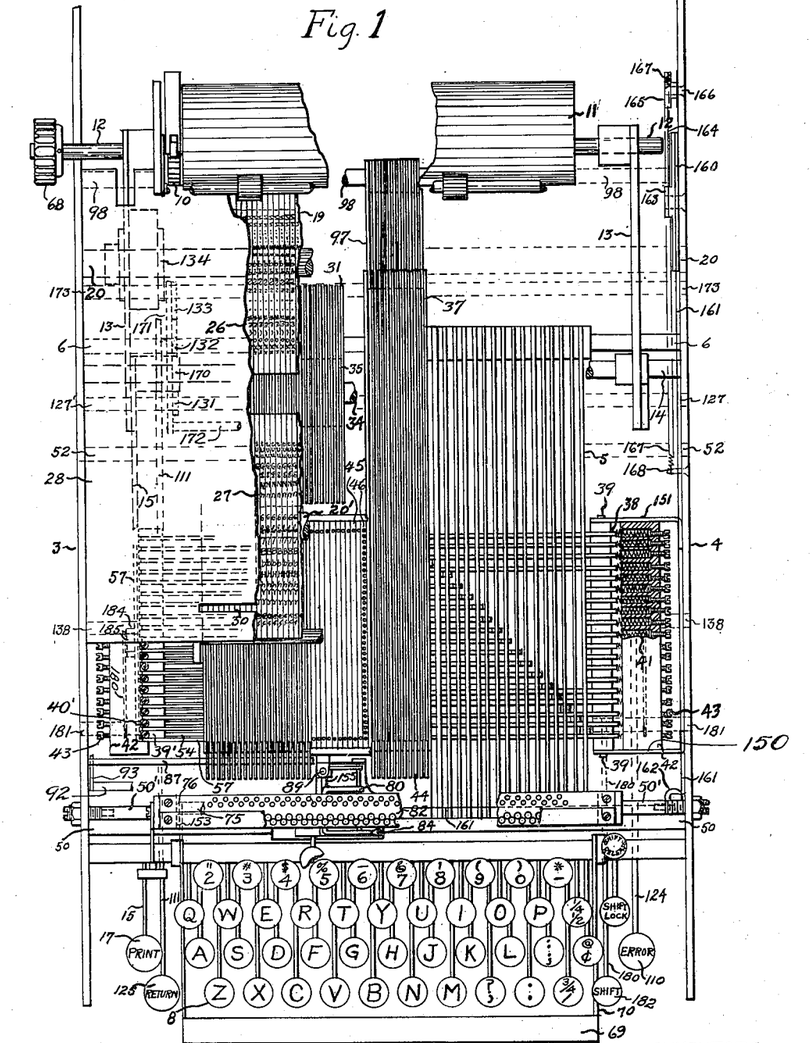
Figure 1 is a top plan view of a machine involving the invention.
Figure 2:
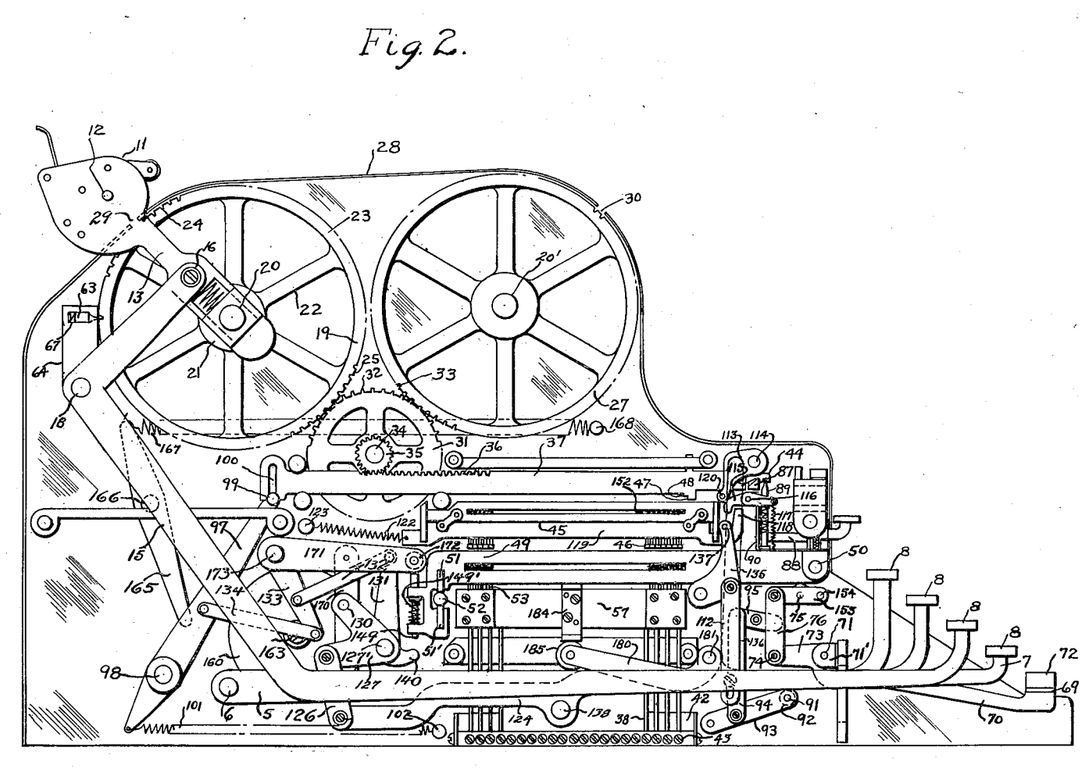
Fig. 2 is a cross-section of Fig. 1, looking toward the upper part of said Fig. 1.

The keyboard of the machine in addition to the keys 8 also carries the space bar 69 (Fig. 1) which extends between the parallel levers 70, which rock on the cross bar or shaft 71 supported by brackets 71' which appear in Fig. 2.

The present machine, unlike those of the ordinary type, does not involve type bars. On the contrary the type are carried upon wheels or disks, which are generally located upon the peripheral or circumferential portion thereof, there being a series of wheels. Each disk or wheel carries upon its periphery the necessary characters, which means that they are usually provided with the alphabet and the digits from 1 to 0 together with certain additional characters. In other words, the front of type, as it may be considered, on each wheel or disk, corresponds with the characters on the keys 8. In the present case, a line of type is set up, and after the line of type has been set and alined, it is printed. The advantages of this are many, the predominant one being that a correction can readily be made before an impression is taken from the set line of type. In co-pending application Ser. No. 459,604 filed April 8, 1921, and in which we are joint inventors, the same features broadly were disclosed; and the present application, among other features of radical importance, differs from what is set forth in said prior application in the manner of the mounting of the type. As a matter of fact, the present machine is very much simpler than that of the application which has been identified.

Figures 5, 6, 7, 8, 9, 10:
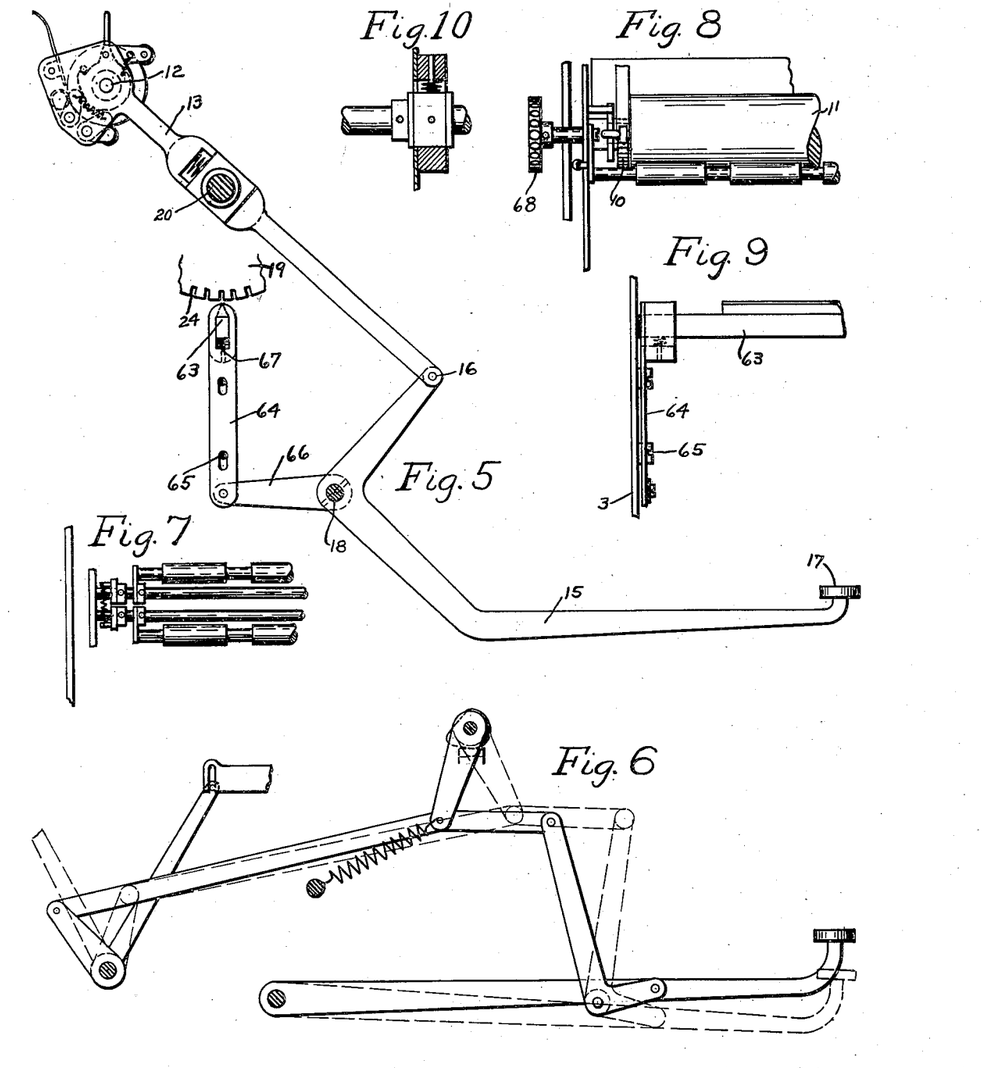
Fig. 5 is a sectional side elevation of the platen mechanism, alining bar, and printing means.
Fig. 6 is a sectional side elevation of rack-returning means.
Fig. 7 is a top plan view of the left hand portion of the platen mechanism.
Fig. 8 is a top plan view of some of the remainder of the platen mechanism.
Fig. 9 is a front view of the alining bar.
Fig. 10 is a cross-section of the print-lever tension slide.
Figure 11:
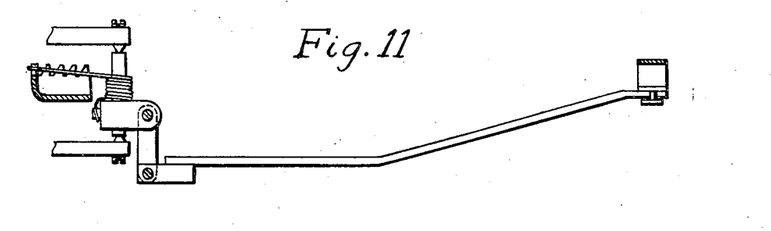
Fig. 11 is a sectional detail of selector and carriage operating mechanism.

The platen mechanism, so-called, involves in its organization, a cylinder or roll as 11 (Fig. 1 for instance), and which rotates with the shaft 12. The shaft 12, as shown for instance in Fig. 5, is supported in proximity to its ends by two levers 13, which collectively present a suitable carrier for the cylinder 11, and which are suspended for an up and down movement by the shaft 20 (see Fig. 1).

As will be inferred from the observations which have been made, a line of type is set and subsequently an impression therefrom is made on paper around the cylinder or roll 11. The length of the line of type thus set up is approximately the same as that of the cylinder. The levers 13 are at opposite sides generally of the machine, being located in proximity to the inner faces of the frame side pieces 3 and 4, as shown best in Fig. 1.

The machine involves in its structure a printing member, as it might be broadly considered, and which can be conveniently made in the form of an angle lever, having a somewhat long bent forward branch and a shorter rear branch; the two branches being at angles to each other, and the shorter one being jointed as by pivoting at 16 to the adjacent lever 13. The longer bent branch of this printing member or lever 15 has an upturned end furnished with a key 17, which bears upon its upper or exposed surface the word "Print" or something equivalent thereto, and which key 17 is pressed down when an imprint is to be made. The lever or printing member 15 is fastened rigidly in some convenient way at about its elbow to the shaft 18 as shown in Figs. 1, 2 and 5. It should be made clear that the material to receive the impression, generally a sheet of paper, is coiled or wound on the cylinder 11, and that after a line of type has been composed this cylinder 11 is bodily moved by being pulled downward to receive the impression, in the present case to the line of composed type and against the type so as to receive an impression of the type on the paper, the type having been previously inked, as will be hereinafter explained.

As already stated, the present machine certainly in one respect, differs from that of the co-pending application already identified in the manner in which the type are carried. These are carriers in the present machine, but as will be inferred, they are rather in the form of wheels or disks 19, each wheel carrying upon its periphery the necessary type, the wheels being practically the same in construction. As shown, they are supported for rotation upon a shaft or spindle 20, which rigidly extends between the side pieces 3 and 4, and they appear in Figs. 1 and 2.

As the wheels or disks 19 are the same, a detailed description of one will aptly apply to the remainder. Each wheel 19 comprises a hub or body portion 21, from which radiate several spokes or arms 22, and of which there may be any desired number, and connected at their outer ends by the rim portion 23, which is radially notched as at 24 on the outer side, to function as will be hereinafter set forth; the stock 25 between the notches 24 constitute type carrying arms, and has on the outer side thereof type as 26 (Fig. 1). The type 26 are of negative-intaglio formation, so as to make obviously a positive print upon paper or equivalent stock. The notches 24 facilitate the rotary feeding, as required of the type wheels 19, as will be hereinafter explained; and they also perform an additional function, as will also be set forth.

Associated with the printing wheels 19 supported by the shaft 20' (Figs. 1 and 2) are what might be termed index wheels 27, which are practically the same in construction and are the same in number, as the printing wheels, except that the characters on the index or indicating wheels 27 are positive.

In other words, if a given wheel 19 carries upon its periphery a series of characters, the co-acting index of indicating wheel generally in front of it will carry the same characters which instead of being negative will be positive as shown for instance in Fig. 1.

The two groups of wheels 19 and 27 as shown are covered by a fixed guard generally in the form of a plate 28 extending between the side pieces 3 and 4 rigidly, and which has slots 29 and 30. The type negatively from which the impression is to be made, makes such an impression through the slot 29, on the paper or equivalent around the cylinder or drum 11. The slot 30 shows the positive type the characters which have been set up and which correspond with the type on the wheel 19, so that in case a line of type has been set up, an error can be corrected before an impression is made.

Associated with the type or printing wheels 19 and the index or indicating wheels 27 are what might be considered actuating or operating wheels. There is, as will be understood, a series of type carrying wheels 19, and a series, of same number, of index or indicating wheels 27. The actuating members, usually in the form of wheels, as has been remarked, involve a series of wheels of similar number. The operating or actuating wheels are each denoted by 31, and peripherally they carry the pins or teeth 32 which extend radially outward from the circumferences thereof, and which mesh into the notches 24 and 33, respectively, of the printing and the index wheels, respectively, so as to impart correspondent motions thereto. The group of operating wheels 31 is loose on a shaft as 34 (Figs. 1 and 2), and outside of the peripheral pins or teeth 32 they resemble structurally very much the printing and the index wheels. The relative diameters of the several groups of wheels may be as desired. With each operating wheel 31 is a pinion 35 rigid and concentric therewith, and the teeth of which mesh with the teeth 36 of racks 37 as shown in Figs. 1 and 2.

The key-levers 5 extend, as will be understood, in a row between the frame side pieces 3 to 4. Under said key-levers are mounted power-transmitting members such as levers 38 of angle form, and which are supported for rocking motion in a row by the bar 39, (Fig. 3), extending from the front toward the rear of the machine between the side pieces 3 and 4, supported by the brackets as 150 and 151, and near the lower end of the frame in the construction shown (Fig. 1). There is an angle lever 38, as will be understood, in cooperative relation with each key lever 5. The ankle levers 38 have operated and operating branches. The operated branches (the longer ones in Fig. 3) have upstanding arms 40, the upper edges of which are immediately under the cooperative key levers 5, so that when a particular key-lever is depressed, it thrusts down the arm or branch 40, and thus the operated arm of the co-acting angle lever 38, so as to swing over the operating arm of said lever to function as will be hereinafter set forth. The several power transferring levers 38 are fulcrumed quite near their elbows upon the shaft 39, and are respectively held in their normal positions and in contact with the appropriate key levers in some convenient way, as by coiled springs 41, each fitting a socketed or spring-carrying member 42, extending in a row from the front toward the rear of the machine, and between the levers 38 and the adjacent side pieces 3 and 4 respectively.

It should be made clear that there are two groups of angle or power transferring levers 38. The springs 41, to which allusion has been made, extend out from the socketed member 42 and bear against the respective levers 38 a slight distance below their centers of motion, so as to thus tend constantly to hold said levers 38 in their initial positions. One of said levers is shown as being in such relation in said Fig. 3.

Figure 3:
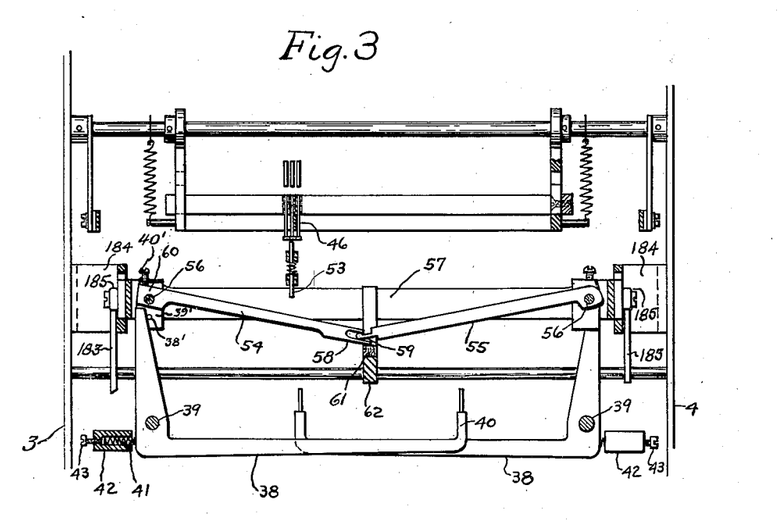
Fig. 3 is a sectional front elevation.

The tension on the respective coiled springs 41 can be governed or regulated at will by screws 43 threaded through the outer sides of the socketed member 42; the inner ends of which bear against the respective springs to accomplish the desired purpose. In Fig. 3, the levers 38 are shown on both sides.

The amount of movement of each rack bar 37 governs the character to be selected from an associated type wheel. Each rack bar is furnished with a catch as 44, which depends from the forward end thereof. For instance, the bar might move a short distance for the selection of a certain character or symbol on the associated type wheel, whereas it would be moved a greater or less distance in the event that other characters are selected for impression from its associated type wheel.

As shown, there is mounted below the rack-bars 37 a stop carrier as 45, which is of sheath-like construction, and which houses within it for vertical movement a group of pins 46, which function as stops, as I will hereinafter explain. The pins 46 are held in position by friction coil springs 152 (Fig. 2). It should be explained that the stop-carriers or sheaths 45 extend in a group or series cross-wise of the machine, there being one stop-carrier or sheath under and associated with each rack bar. On the rack bars 37 are two notches 47 and 48 and it should be explained that when a stop pin as 46 is elevated half its full motion, the selection of a small case letter of the alphabet will be the result, or it might be some other symbol in the lower case group; whereas, if a stop pin is projected practically up to the under edge of a bar 37, or its full motion, this will mean the selection of a cap letter or something else in the upper case; in that when the particular stop pin is elevated and when a rack 37 is advanced or moved toward the left, the notches 47 or 48 of the rack 37 will strike the elevated stop pin 46 to arrest the further advance movement of the bar 37.

The selecting mechanism involves in its structure what might be considered as a carriage 49, as shown for instance in Figs. 2, 19, 20 and 21. As shown, the carriage 49 is supported at its forward end by the rod or bar 50, extending between the frame side pieces 3 and 4. At its rear end said carrier is shown provided with two pendent rolls 51 and 51' which roll on the rail 52 between the frame side pieces 3 and 4, so that the carrier 49 can travel practically from one side to the other side of the machine.

The travelling carrier 49 suspends as shown for vertical movement the selecting members or pins 53, which extend in a group longitudinally of the carrier 49, with their lower ends extending below the body of the carrier, and their upper ends above said body, as shown for instance in Fig. 2. It will be assumed that the carrier 49 is in its initial position at the left in Fig. 1, and that a key 8 is depressed; this results in the lowering of the corresponding key lever 5.

The selecting mechanism also involves a series of levers arranged in pairs, there being a pair of levers in connection with each lever 38, as shown for instance in Fig. 3. The levers of a pair are denoted by 54 and 55; and are pivoted at their butts to shafts as 56 near opposite sides of the frame 2. There may in fact, and as shown in Fig. 3, be extended between the shafts 56, a frame as 57, which obviously is intended to permit the construction of this mechanism as a single unit. The respective pairs of levers 54 and 55 intermesh constantly, desirably, as will be hereinafter explained. As shown, each lever 54 is provided at its inner end with a fork 58, the lower branches of the respective forks being as shown, somewhat longer than the upper branches thereof, and receiving between them the extensions 59 at the inner ends of the respective levers 55; the free ends of said extensions being rounded where they are situated between the branches of the forks 58, so as to maintain constantly a positive coupled relation between the respective pairs of levers 54 and 55. It will be remembered that each lever 38 has been described as constituting an operated branch or portion and an operating branch or portion. The operating branch of a lever 38, for instance that on the left in Fig. 3, engages the pin 38' located in ear 39' which rocks on bar 56 and straddles the lever 54, which operates lever 54 through adjusting screw 40' which comes in contact with head 60 of lever 54, so that when a lever 38 acts against aforesaid described mechanism, said lever 54 will be elevated and, by virtue of its described connection with the complemental lever 55, will lift the latter with it into horizontal position. Both levers 54 and 55 co-act with each other and operate, moving absolutely in synchronism.

Where a pair of levers 54 and 55 inter-engage at their free ends, they rest, through the lever 54, desirably upon a pad as 61 of, for instance, felt or some soft fabric, and which is united to the upper side of a fixed strip 62, extending from the front to the rear of the machine (see Fig. 3). Normally this is the initial condition of the connected levers 54 and 55, and appears in Fig. 3.

It will be assumed that a character is to be selected for printing. In this event the operator will press down upon a key 8 so as to correspondingly depress the lever 5 which carries the key in question. Upon the depression of such lever it forces down the long arm of the lever 38, appearing in Fig. 3; swings over the short arm thereof, so that said short arm will ride against the pin 38' swinging the said lever 54 to a horizontal position; so that said lever will correspondingly move the complemental lever 55. The two levers 54 and 55 which are thus horizontally aligned will act against a pin as selecting pin 53, and thus elevate said selecting pin. As the selecting pin 53 is thus lifted, it engages the butt portion of a stop pin 46, and thrusts said stop pin upwardly and into the path of the notch 47 or 48 will strike the selected stop pin 46 and thus arrest the rearward or advance motion of the rack bar 37.

The locker 63 is yieldingly upheld by a spring as 67 of coiled form, bearing against the butt or body of the locker and held in sockets or seats in the strips 64. This prevents breakage of anything when the aligning mechanism is set into action to line up the type. It will be remembered that the rods 13 support the printing cylinder 11. The rods 13 are jointed as by pivoting in the manner described to the upper ends of the angle levers 15. The construction is of such character that when the key 17 is pressed down in the manner noted, to align positively the type, the rods 13 partaking of such motion, shift the cylinder 11, assumed at this time to be carrying a sheet of paper, so as to effectually carry the cylinder with the paper thereon against the line of type on the printing wheels 19. After a line of type has been set and a print taken from it on the paper on the cylinder 11, the cylinder is rotated for line spacing. The line spacing may be brought about in any convenient way, as for instance by the manipulation of the knob or finger wheel 68. It is proper to state that the line spacing of the machine constitutes no part of the present invention. As a matter of fact, it may be like that used on ordinary typewriting machines such as those known as Remington or Underwood or it may be like that shown in the copending application which has already been identified.

Figure 4:
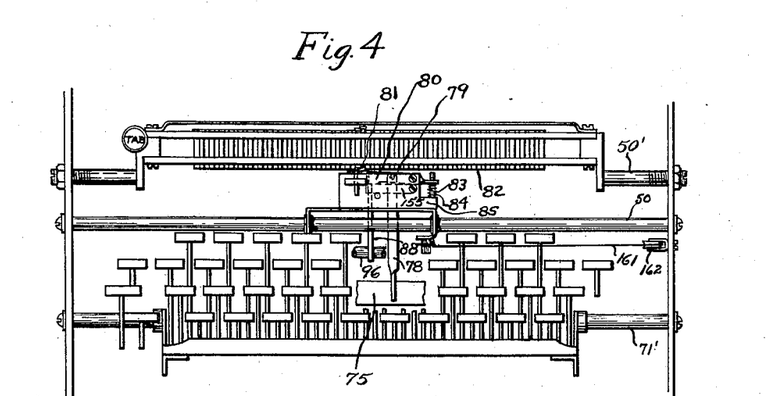
Fig. 4 is a front view, frail, carriage and key board.

The spacing mechanism involves a bail such as that denoted in a general way by 69, see Figs. 1 and 2. This bail comprises side bars or rocking strips 70 which are sustained for rocking movement upon the cross bar 71 extending between the strips 70, supported by the brackets 71', and which are connected at their forward ends by the finger strip 72. The rock levers or side bars 70 have at their rearward ends arms as 73 which are pivoted to the link 76 which is pivoted to the link 153, see Fig. 2 for example, which is pivoted for rocking motion at 154 extending between the links 153 and rigidly thereto is the shaft 75. The shaft 75 has longitudinally slidable upon it the lower notched end of the lever 78 forming part of the escapement mechanism, Figs. 4 and 19. This lever 78 is free to have a limited amount of swing as the escapement mechanism advances or moves toward the right in Figs. 4 and 19. At its upper end it is pivotally connected as at 79 to the loose dog 80 of the escapement. The fixed dog of the escapement mechanism is denoted by 81 and cooperates with the rack 82 which is in fixed relation with the cylinder 11. It will be assumed that the dog 80 is down which is its normal relation and that the fixed dog 81 is against the first tooth of the rack 82. The dog 80 is normally held down by a spring 83 engaging its tail encircling the pin 84 and supported by the frame member 85 which is rigid with the selector frame or carriage 49, when a key as 8 is thrust down in the manner hereinbefore described. When the space bar 69 is depressed, the shaft 75 is forced upward, thus imparting an upward thrust to the lever 78 and as a consequence lifting the dog 80, the fixed dog 81 at the same time being against a tooth of a rack. This action raises the pivoted dog 81 up over the top of the fixed dog 80 so that the latter will be freed from the rack 82 and thus will cause the forward movement of the carriage 49. This action is continued until the carriage 49 reaches the end of the rack 82 (Fig. 4). The carriage 49 is then returned to its initial position by grasping the frame member 85 (Fig. 4).

No inking mechanism is shown. It may be of any suitable character. For instance, such as is shown in the application already mentioned.

At the front of each rack bar 37, is pivoted a catch 44 (Fig. 2) which is notched on its lower side to engage the upper edge portion of a strip 87 extending crosswise of the machine between the frame side pieces 3 and 4, the notched portion of the catch normally fitting the strip so as to prevent movement thereof. Mounted below the dog 80 is a lifting lever 155 which is pivoted at its butt in the frame member 85. The lifting lever acts against the butt portion of the pin 89 normally held down by a spring 90 (Fig. 2). Extending crosswise of the machine under the key levers 5 is a rod 91 having peripherally a padded covering 92 which is directly engaged by the under sides of the key levers 5. The ends of the rod 91 are supported by arms as 93 which swing on the sides 3 and 4 of the frame work. Rising from the rod or bar 91 is the link 94 connected at its upper end to the lever 95 pivoted between its ends and the forward end of which is connected to the shaft 96. The shaft 96 has longitudinally slidable upon it the lower notched end of the lever 88 (Fig. 19) so that when a key lever 5 is depressed in the manner hereinbefore described, it acts through the intermediate parts and which are shown for instance, in Figs. 2 and 19 to elevate the pin 89 so that said pin will correspondingly lift the catch 44 and thus free the catch from the holding strip 87. Thus to permit the rack bar 37 to be fed forwardly or to be advanced or moved toward the rear of the machine by the action of an arm or lever 97 pivoted at its lower end on a shaft 98 on the frame of the machine. Each lever or arm 97 has at its upper or free end a pin 99 to fit a slot 100. At the forward or back end of its cooperative bar 37, connected with each swinging arm or lever 97 below the center of motion thereof is a coiled pull spring 101. The opposite ends of these springs are in hooked engagement with a cross rod 102. When, therefore, a rack bar as 37 is freed by the lifting of its catch 44, the coiled pull spring associated therewith, in view of the fact that the bar is now freed, will advance or move toward the rear of the machine the bar 37 associated therewith so that said bar 37 through its rack 36 can turn and actuate an operating wheel 31 to effect the action of a type wheel 19.

Figure 18:
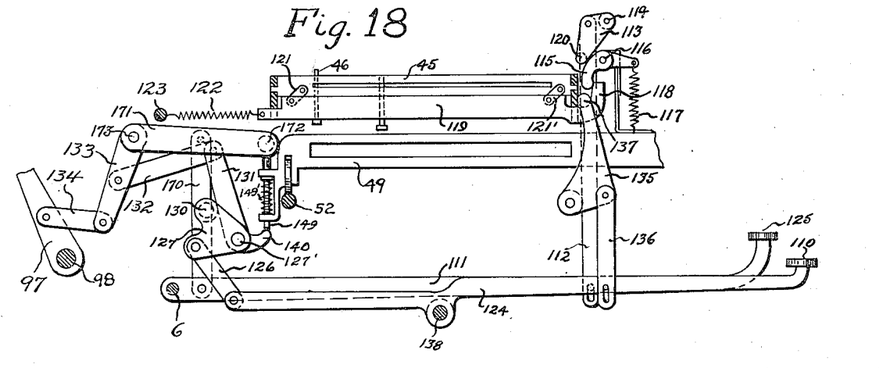
Fig. 18 is a sectional side elevation of the rack-return ends.

The racks 37 are advanced towards the left in Fig. 2 so as to effect the action of wheels as 31 which in turn act in the manner hereinbefore set forth upon the printing wheels 19 so as to compose a line of type. The racks 37 are naturally moved backwardly or forwardly of the machine toward their normal positions, which are shown as occupying in Fig. 2, and during this motion the several trains of gears, each train being composed of a pinion 35 which is fixed to intermediate wheels 19 are set in rotation. The pin casts or sheaths 45 are stationary across the machine as shown in Fig. 18. There may be instances where a wrong pin 46 is elevated. In this event, the point is to get the pin 46 thus incorrectly elevated to its initial position. The key board contains a key with the marking "Error" upon it. At the end of the lever 111, which rocks on the shaft 6, the lever 111 being complementary to the levers 5 hereinbefore specified. To the lever 111, is loosely connected a link 112, the upper end of which is jointed to the lever or rocker 113, pivoted at 114. The rocker 113 engages the pawl 115, which is pivoted between its ends at 116 to the carriage frame and the tail of which has connected with it a coiled pull string 117 aligned to the carriage frame 49. Also connected to the lever 111 at a point near the shaft 6 is the link 170 which is connected to the link 171. There is a shaft 172 which extends across the machine fastened rigidly to the ends of the link 171. The link 171 rocks on the shaft 173 which is fastened between the side pieces or frames 3 and 4. At the end of the carriage 49 is carried a pin 149 held in its normal position by the spring 149' as shown in Figure 18. Directly over the pin 149 is the shaft 172. It will be assumed that a wrong pin as 46 has been elevated and that a rack 37 has been advanced so that the notch 47 has engaged the pin 46. In the event that it is desired to return the pin 46 and the rack bar 37 to their normal positions the following procedure will be adopted: The key 110 will be engaged with the finger, thus through the lever 111, drawing down the link 112 and swinging down the rocker 113, correspondingly moving the pawl against the hook 118 and as a result swinging down the rectifier 119 which in turn lowers the pin 46. At the same time the aforementioned action takes place, through the lever 111 drawing down the link 170 and swinging down the link 171, correspondingly drawing down the shaft 172 which engages the pin 149 forcing the pin downward against the elbow 140 of the link 131 thus through the links 132, 133 and 134 pulling forward the lever 97 correspondingly moving to its normal position the rack bar 37.

There is a lever 124, Figure 18, complementary to the lever 5 mounted for rocking motion upon the shaft 138 and having at its front end the key 125 which bears the word "Return" or something of a similar nature. To the rear end of lever 124 is jointed a link 126 similarly connected to the lever 127 mounted for rocking motion upon the shaft 127' which extends between the side pieces 3 and 4. To the lever 127 is fastened rigidly the shaft 130 which extends entirely across the machine and is in contact with the levers 131 in their normal position.

It will be assumed that a number of rack bars 37 have been advanced and that a number of pins 46 have been elevated and that it is desired to return the pins to their initial positions. In this event the following procedure will be adopted. The key 125 will be engaged by the finger the lever 124, pushing the lever 126 upward and correspondingly moving the lever 127 causing the shaft 130 to move forward the links 131 and thus through the connecting links hereinbefore described, move forward the lever or arm 97 which correspondingly moves the racks 37 to their natural positions. When this action takes place, through the depression of the key 125 and the lever 124, the link 136 is moved downward correspondingly moving the lever 135 which causes the shaft 137 to move forward engaging the hook 118 and as a result swinging down the rectifier 119 which in turn lowers the pins 46 to their initial position.

Figure 19:
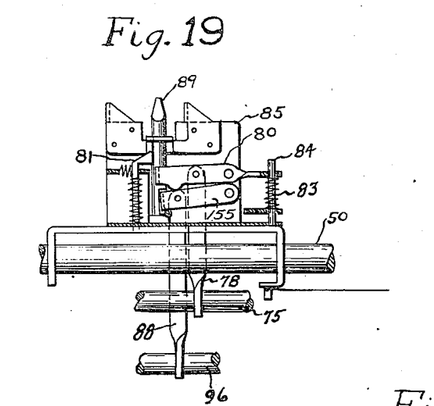
Fig. 19 is the front view of the carriage.
Figure 20:
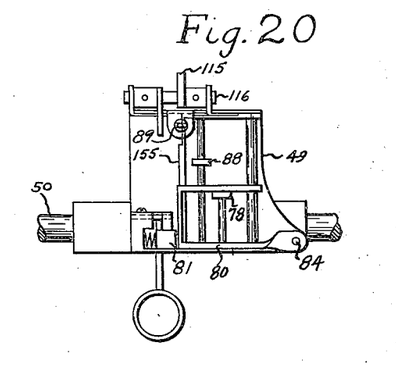
Fig. 20 is the top plan view of the same.
Figure 21:
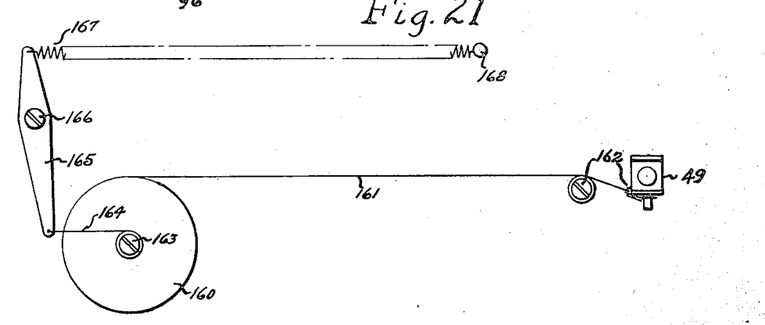
Fig. 21 is an elevation of carriage-feed mechanism.

On the side of the machine, as shown in Figures 1, 19 and 21 for instance, and generally carried upon the plate 4, is a drum or roller 160 upon which is windable a connector or cord 161 that extends over to the carriage 49 passing over one or more guide rolls 162 on the framework of the machine. Co-axially with the drum 160 and generally rigid therewith, is a smaller drum 163 over which passes the connector or cord 164, which is connected with the lower end of the lever 165 pivoted at 166 to the side 4 of the framework near the rear thereof. To the upper arm or branch of said lever 165 is connected the rear end of a coiled pull spring 167, the forward end of which is engaged with a pin 168 extending inwardly from the forward portion of the side frame member 4. This structure provides a ready and simple means for advancing the carriage 49, the step by step forward motion of which is controlled by the rack mechanism already referred to.

Figure 12:
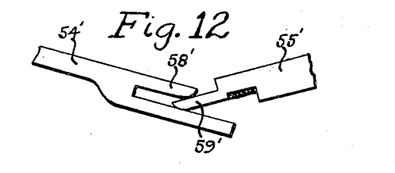
Fig. 12 to Fig. 14, are detail views of riser bars as shown in different positions.

In Figure 12, the levers denoted by 54' and 55' are interengaged at their inner ends. In this structure the lever 54' has at its end a yoke formation the upper projection 58' rests at all times upon the projection 59' which extends between the yoke of the lever 54'.

Figure 13:
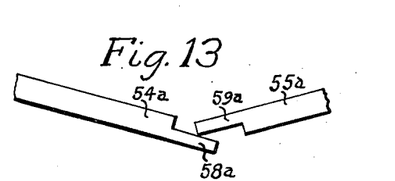

In Figure 13 the levers denoted by 54ª and 55ª are interengaged at their ends. In this structure the lever 54ª has at its end a projection 58ª which receives within it the projection 59ª.

Figure 14:
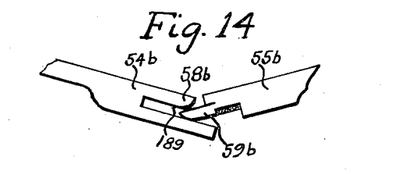

In Figure 14 the levers and mechanism are the same as the levers in Figure 13 except that the projections 58ᵇ and 59ᵇ are kept in positive contact with each other by the leaf spring 189.

Figure 15:
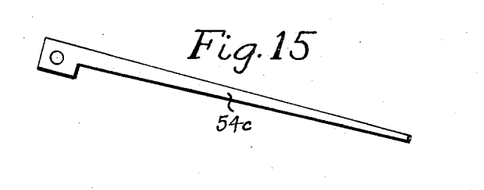
Fig. 15 is an elevation of modified form of riser bar.

In Figure 15 a single lever 54ᶜ is shown which functions after the fashion of the levers shown in Figures 12, 13 and 14.

Figure 16:
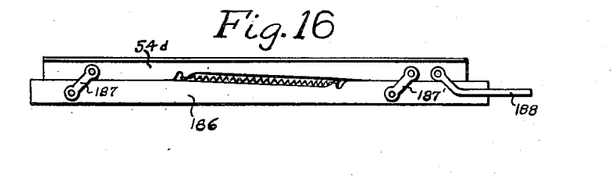
Fig. 16 is a front elevation of riser bar and certain associated mechanism.

In Figure 16 the lever denoted by 54ᵈ is shown connected to the strip 186, which extends between the frame of the machine, by the links 187 and 187'. By operating the loosely connected lever 188, the lever 54ᵈ functions after the fashion of the levers shown in Figures 12, 13 and 14 and 15.

Figure 17:
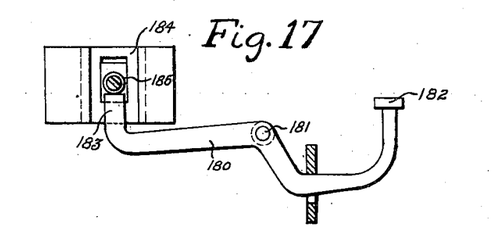
Fig. 17 is a sectional side elevation of the shift lever.

There is a lever 180, Figures 2 and 17, pivoted for rocking motion upon the shaft 181 having at its forward end the key 182 which bears the words "Shift" or something of a similar nature. At the rear end of the lever 180 is an upstanding arm 183 which rests against the roller 185 which projects from the side of the frame 57 (Figure 3) and through the brackets 184 which are fastened rigidly to the frame pieces 3 and 4 (Figure 1). It will be assumed that it is desired to select, for printing, a capital letter. In this event the following procedure will be adopted. The key 182 (Figure 17) will be engaged with the finger, thus through the lever 180, its branch 183 and the roller 185, the frame 57 (Figure 3) which holds the levers 54 and 55, is elevated so that a stop pin 46 (Figure 2) is elevated to engage the notch 48 of the rack bar 37, which operation selects a capital letter on the printing wheel 19 as hereinbefore described.

What I claim is:

1. A typewriting machine involving a series of interengaging levers, soft means on which one lever of each series rests when in its normal position, a series of key levers, levers for transferring the effects of the key levers to the first mentioned levers, and yieldable means acting constantly against said second mentioned levers in proximity to the center of motion thereof.

2. A typewriting machine involving a carriage, a roll, a cord windably on said roll and connected with the carriage, a second roll rigidly coaxial with the first roll, a cord windably on the second roll, a lever connected with said cord, a spring extending between said lever and the framing of the machine to oscillate said lever, and through said roll, and cord mechanism, imparting an advancing motion to the carriage, and means for causing such movement of the carriage step by step.

3. A typewriting machine comprising a series of printing wheels arranged in side by side co-axial relation, and peripherally provided with characters which are duplicates of each other, means involving a series of racks for operating the printing wheels, a lever for advancing each rack, and spring means for operating the levers.

4. A typewriting machine comprising a series of printing wheels arranged in side by side coaxial relation and each peripherally provided with characters which are duplicates of each other, means involving a series of racks for rotating each printing wheel to bring a character into line with characters on other printing wheels to form a line of matter, levers connected with the racks in such manner as to permit relative movement at the points of connection between the levers and the racks, and spring means for operating the levers.

CHARLES WELLINGTON WALKER, deceased,
By ARIO C. WALKER,
   *Administrator.*
ARIO C. WALKER.